Sept. 3, 1929.  H. R. GIBBONS  1,726,557
CAR TRUCK CONSTRUCTION
Filed Jan. 13, 1928  2 Sheets-Sheet 1

INVENTOR:
HAROLD R. GIBBONS,
BY Gales P. Moore
HIS ATTORNEY.

Sept. 3, 1929.  H. R. GIBBONS  1,726,557
CAR TRUCK CONSTRUCTION
Filed Jan. 13, 1928  2 Sheets-Sheet 2
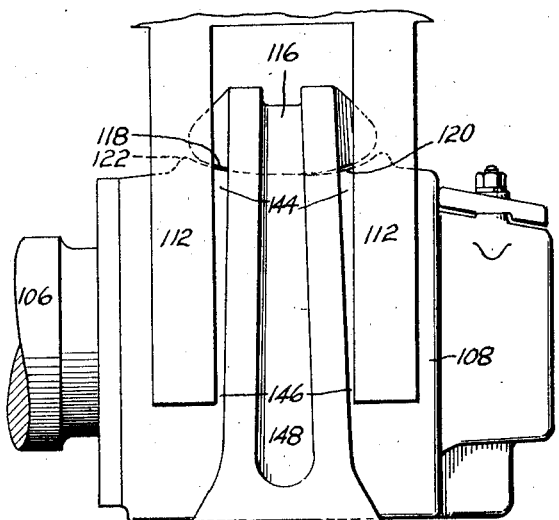
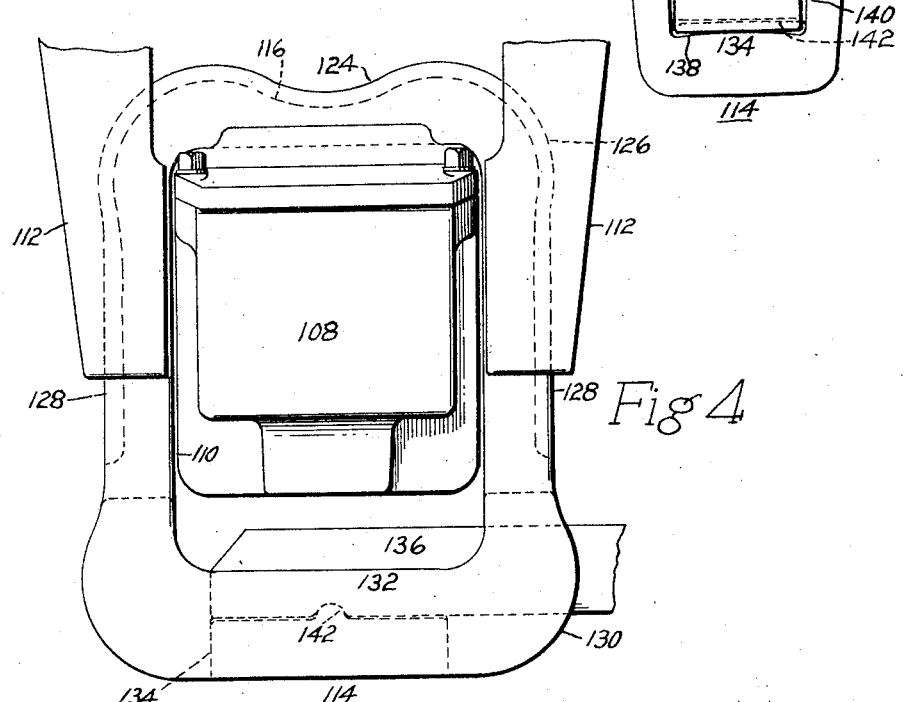
INVENTOR:
HAROLD R. GIBBONS,
BY Gales P. Moore
HIS ATTORNEY.

Patented Sept. 3, 1929.

1,726,557

UNITED STATES PATENT OFFICE.

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE.

CAR-TRUCK CONSTRUCTION.

Application filed January 13, 1928. Serial No. 246,613.

This invention relates to car truck construction and comprises all the features of novelty herein disclosed. An object of the invention is to provide improved devices for suspending a car frame or body on an axle. Another object is to provide a supporting device which will allow generous lateral movement of the axle box and axle with respect to the car pedestals and a more limited lateral movement of the equalizer or similar frame member with respect to the pedestals. Another object is to provide an improved vehicle frame suspension which will minimize strain and shocks due to irregularities in the travelled surface. To these ends and to improve generally upon devices of this general character, the invention also consists in the various matters herein disclosed and claimed.

In the drawings, Fig. 1 is a side view of the axle box and associated mechanism.

Fig. 3 is a view similar to Fig. 1 of another embodiment of the invention and

Fig. 4 is an end view of Fig. 3.

Figure 1:
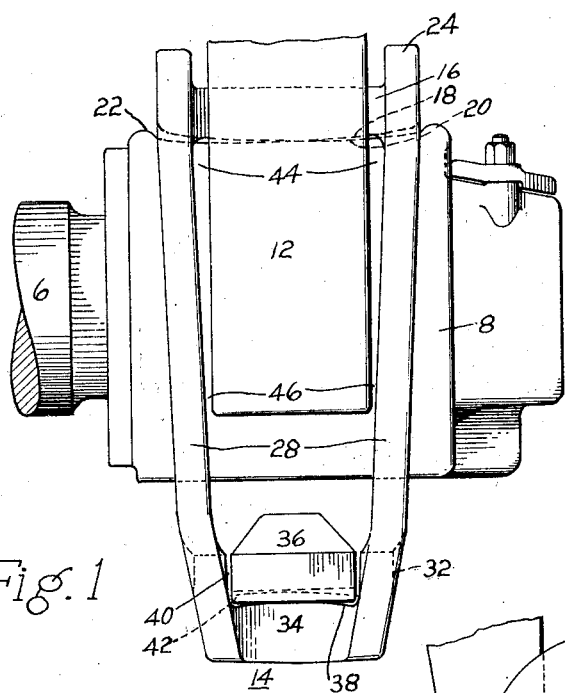

The numeral 6 indicates a portion of a car axle which is supported by wheels (not shown) and extends into an axle box 8 where it is journalled in any suitable way. The sides of the box are preferably straight and flat as indicated at 10 and are closely embraced by the usual pedestals 12 which depend from the side frame (not shown). Encircling the box and suspended from it is a one-piece yoke or link 14. The yoke has a top seat plate 16 which has a rockable engagement with the box, its lower surface preferably being convex or crowned as at 18 with a curvature of smaller radius than a cooperating seat 20 on the top of the box. Either or both of the seating surfaces may be curved longitudinally of the axle. The box has upwardly extending rounded projections 22 which have a clearance with the yoke but prevent displacement of the latter.

The yoke has side flanges 24 at the top with arcuate portions 26 joined to pairs of side arms 28 which extend vertically down the sides of the box alongside of but near the pedestals. The side arms are joined by arcuate portions 30 to bottom side flanges 32 which are connected together by a bottom seat plate 34. The seat plate 34 has a rocking engagement with an underslung frame member, such as an equalizer bar 36, which extends lengthwise of the vehicle to engage a similar seat plate below the next axle box. The upper surface of the seat plate is preferably convex or crowned as indicated at 38 to engage the bottom of the equalizer bar which has a small converging side clearance at 40 with the bottom side flanges 32. The equalizer bar has ample clearance with the bottom of the box and passes between two side arms of a pair to engage its seat. A crowned projection 42 on the seat plate fits a slot in the equalizer bar to hold the latter from longitudinal shifting.

The side arms 28 converge or incline laterally from top to bottom so that they have generous clearance at 44 with the pedestals but this clearance decreases progressively to the point 46. The axle box and yoke can thus rock freely around the lower seat as a fulcrum yet the equalizer bar and yoke cannot rock very far around the upper seat as a fulcrum. This clearance feature thus permits a generous lateral shifting movement of the axle box relatively to the pedestal but allows only a limited movement of the equalizer bar with respect to the pedestal. This is an important consideration because the truck frame which is rigidly attached to the pedestals will not surge to and fro with the lateral shifting of the axle box. The weight of the car tends to make the yoke hang vertically with the weight at the upper seat applied to the center of the axle box to thus equalize the load on the axle bearings.

Figure 2:
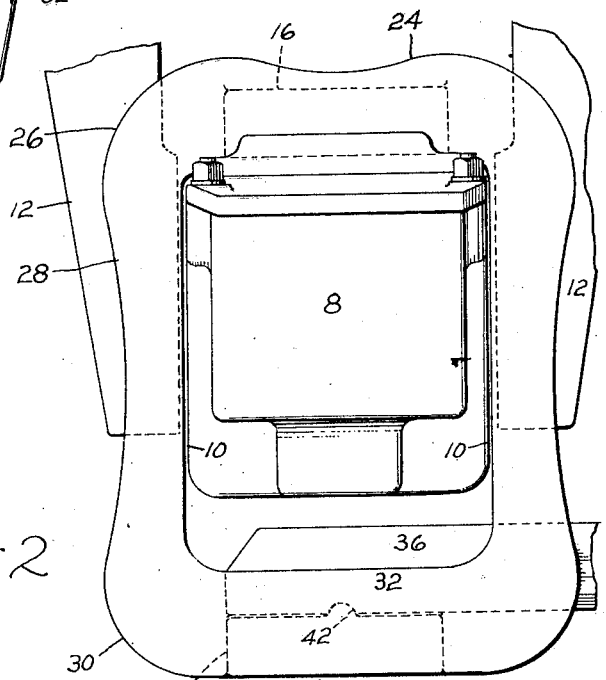
Fig. 2 is an end view.

Parts 106 to 144 in Figs. 3 and 4 are similar to parts 6 to 44 in Figs. 1 and 2. The pedestals 112 are divided, however, to straddle a narrow yoke 114 whose side arms 128 diverge from top to bottom to give ample clearance with the pedestals at 144 and less clearance at 146. The side arms 128 are joined together by a web at 148 and the top seat 120 is narrower than in Fig. 1 but otherwise the construction is substantially identical with Fig. 1.

Although the invention has been described by reference to certain specific embodiments, it should be understood that, in its broader aspects, the invention is not necessarily limited thereto.

I claim:

1. In a device of the character described, an axle, an axle box, pedestals embracing the sides of the box, a yoke encircling the axle box and having a seat thereon, the yoke and the pedestals entering one within the other to limit relative lateral shifting, and a frame member seated on the lower end of the yoke under the axle box; substantially as described.

2. In a device of the character described, an axle, an axle box, pedestals embracing the sides of the box, a yoke encircling the axle box and having a rocking engagement therewith, the yoke having side arms lying alongside of the pedestals, and a frame member seated on the lower end of the yoke and having a rocking engagement therewith; substantially as described.

3. In a device of the character described, an axle, an axle box, pedestals embracing the sides of the box, a yoke encircling the axle box and having a rocking engagement therewith, a frame member seated at the lower end of the yoke and having a rocking engagement therewith, the sides of the yoke lying alongside of the pedestals and having a clearance therewith, the clearance between the pedestals and the sides of the yoke being greater near the top of the pedestals than near the bottom; substantially as described.

4. In a device of the character described, an axle, an axle box, pedestals embracing the sides of the box, a yoke encircling the box and having a rocking engagement therewith, a frame member seated at the lower end of the yoke and having a rocking engagement therewith, the yoke having pairs of side arms alongside the pedestals and inclining with respect to the pedestals to have decreasing clearance therewith from top to bottom; substantially as described.

5. In a device of the character described, an axle, an axle box, a pedestal at the side of the box, a suspending member having a rocking seat on the top of the box with side arms extending downwardly alongside the pedestal to limit lateral shifting, a seat connected to the side arms and arranged below the box, and a frame member having rocking support on the seat; substantially as described.

6. In a device of the character described, an axle, an axle box, a pedestal at the side of the box, a suspending member having a rocking seat on the top of the box, an equalizer bar having a rocking engagement with the suspending member under the axle box, the suspending member and pedestal being constructed and arranged to limit lateral movement of the equalizer bar with respect to the pedestal while allowing a more generous lateral movement of the box with respect to the pedestal; substantially as described.

7. In a device of the character described, an axle, an axle box, a yoke encircling the axle box and having a rocking engagement with the top thereof, and a frame member seated on the lower end of the yoke and having a rocking engagement therewith; substantially as described.

8. In a device of the character described, an axle, an axle box, a yoke encircling the axle box and having a central seat plate rockably supported on the top of the axle box, the yoke having a lower seat plate directly under the axle box, and a frame member extending under the axle box and having a rocking support on the lower seat plate; substantially as described.

9. In a device of the character described, an axle, an axle box, a seat plate resting on the top of the axle box, the seat plate and the axle box having relatively crowned engaging surfaces to allow rocking movement, arms connected to the seat plate and embracing the axle box, a lower seat plate connecting the arms below the axle box, a frame member resting on the lower seat plate, the frame member and the lower seat plate having relatively crowned engaging surfaces to allow lateral rocking movement; substantially as described.

10. In a device of the character described, an axle, an axle box having a top seat curved longitudinally of the axle, a seat plate having a crowned seat curved on a different radius to rock on the axle box seat, arms connected to the seat plate and embracing the axle box, a lower seat plate connecting the lower ends of the arms below the axle box, the lower seat plate being crowned longitudinally of the axle, and a frame member resting on the lower seat plate for rocking movement thereon; substantially as described.

11. In a device of the character described, an axle, an axle box, a seat plate resting on the top of the axle box, the seat plate and the axle box having relatively crowned engaging surfaces to allow rocking movement, the axle box having limiting projections to retain the seat plate upon it, arms connected to the seat plate and embracing the axle box, a lower seat plate connecting the arms below the axle box, a frame member resting on the lower seat plate, the frame member and the lower seat plate having relatively crowned engaging surfaces to allow lateral rocking movement; substantially as described.

12. In a device of the character described, an axle, an axle box, a yoke encircling the axle box and having a central seat plate, the axle box and the seat plate having relatively crowned engaging surfaces to allow rocking movement, and an equalizer bar supported on the yoke in under-slung relation to the axle box; substantially as described.

13. In a device of the character described, an axle, an axle box, a yoke encircling the axle box and having a seat thereon, the yoke having arms embracing the axle box and depending below the axle box, a seat plate connecting the arms below the axle box, an equalizer bar seated on the seat plate, the bar and the seat plate having relatively crowned engaging surfaces to allow lateral rocking movement; substantially as described.

14. In a device of the character described, an axle, an axle box, a yoke encircling the axle box and having a rocking engagement therewith, the yoke having pairs of side arms embracing the axle box, a seat plate connecting the side arms and arranged beneath the axle box, and an equalizer bar extending between the side arms of one pair and having rocking engagement with the seat plate; substantially as described.

15. In a device of the character described, an axle, an axle box, a yoke embracing the axle box and having a rocking engagement with the top thereof, an equalizer bar seated on the lower end of the yoke and having a rocking engagement therewith, and pedestals embracing the axle box and limiting lateral rocking of the yoke; substantially as described.

In testimony whereof I hereunto affix my signature.

HAROLD R. GIBBONS.